(12) United States Patent
Kim et al.

(10) Patent No.: US 11,307,566 B2
(45) Date of Patent: Apr. 19, 2022

(54) SYSTEM AND METHOD FOR DIAGNOSING PNEUMATIC CONTROL VALVE ONLINE

(71) Applicant: KOREA HYDRO & NUCLEAR POWER CO., LTD, Gyeongsangbuk-do (KR)

(72) Inventors: Yang Seok Kim, Daejeon (KR); Bum Nyun Kim, Gyeongsangbuk-do (KR); Dae Woong Kim, Sejong (KR); Ji In Kim, Seoul (KR); Nam Woo Choi, Gyeonggi-do (KR); Ju Hyung Kang, Gyeongsangbuk-do (KR); Young Sheop Park, Sejong (KR); Chi Yong Park, Daejeon (KR); Jong Seog Kim, Daejeon (KR); Hyoung Kyun Kim, Daejeon (KR); Byoung Oh Lee, Daejeon (KR); Hee Seung Chang, Daejeon (KR); You Soo Shin, Gyeongsangbuk-do (KR)

(73) Assignee: Korea Hydro & Nuclear Power Co., LTD, Gyeongsangbuk-do (KR)

( * ) Notice: Subject to any disclaimer, the term of this patent is extended or adjusted under 35 U.S.C. 154(b) by 546 days.

(21) Appl. No.: 16/328,650

(22) PCT Filed: Aug. 30, 2017

(86) PCT No.: PCT/KR2017/009476
§ 371 (c)(1),
(2) Date: Feb. 26, 2019

(87) PCT Pub. No.: WO2018/044061
PCT Pub. Date: Mar. 8, 2018

(65) Prior Publication Data
US 2021/0278830 A1    Sep. 9, 2021

Related U.S. Application Data

(63) Continuation of application No. PCT/KR2017/009476, filed on Aug. 30, 2017.

(30) Foreign Application Priority Data

Aug. 30, 2016   (KR) ........................ 10-2016-0110619

(51) Int. Cl.
  *G01M 13/003*   (2019.01)
  *G05B 23/02*    (2006.01)

(52) U.S. Cl.
  CPC ....... *G05B 23/0221* (2013.01); *G01M 13/003* (2019.01); *G05B 23/0264* (2013.01); *G05B 23/0272* (2013.01)

(58) Field of Classification Search
  CPC ............ G05B 23/0221; G05B 23/0264; G05B 23/0272; G05B 2219/24048;
  (Continued)

(56) References Cited

U.S. PATENT DOCUMENTS

| | | | |
|---|---|---|---|
| 6,035,878 | A | 3/2000 | Adams et al. |
| 6,176,247 | B1 | 1/2001 | Winchomb et al. |

(Continued)

FOREIGN PATENT DOCUMENTS

| | | |
|---|---|---|
| CN | 1271410 | 10/2000 |
| CN | 1280681 | 1/2001 |

(Continued)

OTHER PUBLICATIONS

Kaseda et al., An Experimental Study on Diagnosis of Operating Characteristics in Pneumatic Control Valve, May 1999, Proceedings of the Society of Instrument and Control Engineers (SICE), vol. 35, No. 5, pp. 594-599 (Year: 1999).*

(Continued)

*Primary Examiner* — Toan M Le
(74) *Attorney, Agent, or Firm* — Occhiuti & Rohlicek LLP

(57) ABSTRACT

System for diagnosing pneumatic control valve online include a sensor set having sensors, attached to a pneumatic (Continued)

control valve, for measuring the state of the pneumatic control valve, a smart data analyzer for processing sensor signal acquired in real time from the sensor set and generating pneumatic control valve state information for online automatic diagnosis of the pneumatic control valve, a data server for transmitting, to an online analysis server, the pneumatic control valve state information received in real time from the smart data analyzer and storing the pneumatic control valve state information for predetermined time period, the online diagnostic server for, by comparing the pneumatic control valve state information with pre-stored normal state data of the pneumatic control valve, determining whether the pneumatic control valve is in abnormal state and generating diagnostic information, and a client computer for displaying the diagnostic information received from the online diagnostic server.

15 Claims, 8 Drawing Sheets

(58) Field of Classification Search
CPC ........... G05B 2219/33284; G05B 2219/33326; G05B 2219/45006; G01M 13/003; F15B 19/00; F15B 19/005; F15B 2211/857; F15B 2211/87; F16K 31/12; F16K 37/00; F16K 37/0041; F16K 37/0083
See application file for complete search history.

(56) References Cited

U.S. PATENT DOCUMENTS

| 8,417,468 | B2* | 4/2013 | Wilke | G01M 3/00 |
|---|---|---|---|---|
| | | | | 702/35 |
| 2003/0033886 | A1 | 2/2003 | Davie et al. | |
| 2005/0060396 | A1 | 3/2005 | Hirooka | |
| 2015/0112639 | A1 | 4/2015 | Kanchi et al. | |
| 2015/0176721 | A1 | 6/2015 | Schoonover et al. | |

FOREIGN PATENT DOCUMENTS

| CN | 1702361 | 11/2005 |
|---|---|---|
| JP | 2010101492 | 5/2010 |
| KR | 19890007306 | 6/1989 |
| KR | 1020050078804 | 8/2005 |
| KR | 100580967 | 5/2006 |
| KR | 20100079166 | 7/2010 |
| KR | 20150071069 | 6/2015 |

OTHER PUBLICATIONS

English translate of Kaseda et al., An Experimental Study on Diagnosis of Operating Characteristics in Pneumatic Control Valve, May 1999, Proceedings of the Society of Instrument and Control Engineers (SICE), vol. 35, No. 5, 25 pp. (Year: 1999).*

* cited by examiner

SYSTEM AND METHOD FOR DIAGNOSING PNEUMATIC CONTROL VALVE ONLINE

CROSS REFERENCE TO RELATED APPLICATIONS

This application is a National Phase under 35 U.S.C. 371 of International Application No. PCT/KR2017/009476 filed on Aug. 30, 2017, which claims priority to Korean Application No. 10-2016-0110619 filed Aug. 30, 2016.

TECHNICAL FIELD

The present invention relates to a pneumatic control valve and, more particularly, to a method and system for diagnosing a pneumatic control valve.

BACKGROUND ART

A pneumatic control valve is a device that performs very important role in power plant operation such as rate of flow adjustment, tank level adjustment, and the like in a power plant, and needs to be driven without failure in normal driving of the power plant. Accordingly, in order to maintain a valve state of the pneumatic control valve, maintenance is performed periodically or an important component is replaced for a predetermined period. In addition, when an abnormal state such as a control is not smooth during operation occurs, the power plant is stopped and the state is checked by using a valve diagnosing equipment. Particularly, in the case of an important control value, the power plant should be shut down when an abnormal state occurs. However, if the abnormal state occurred during operation is accurately diagnosed and available to provide information for future progress, it is beneficial economically. However, a system that is able to diagnose in online in a remote location is still not existed. Accordingly, there is a problem that separate equipment for diagnosing a valve is moved to the place where the valve is installed and the valve is directly diagnosed, when it is required, and diagnosis is not available while the valve is driven.

PRIOR ART DOCUMENT

Patent Document (Patent document 1) Korean Patent Application Publication 2010-0079166 (Online integrated monitoring system for integrity of power generating unit)

DISCLOSURE

Technical Problem

An object of the present invention to solve the problem described above is to provide a system for diagnosing a pneumatic control valve in online that is able to diagnose an abnormality of a target control value by obtaining data from a stem force sensor, a displacement sensor and a pressure sensor mounted on the pneumatic control valve, extracting and transmitting data required for online diagnosis selectively, and that is able to diagnose future progress of the abnormality in real-time.

Another object of the present invention to solve the problem described above is to provide a method for diagnosing a pneumatic control valve in online that is able to diagnose an abnormality of a target control value by obtaining data from a stem force sensor, a displacement sensor and a pressure sensor mounted on the pneumatic control valve extracting and transmitting data required for online diagnosis selectively, and that is able to diagnose future progress of the abnormality in real-time.

The technical problems to solve in the present invention are not limited thereto, but may be extended in various manners within the scope not departing from the concept and scope of the present invention.

Technical Solution

A system for diagnosing a pneumatic control valve online according to an embodiment of the present invention to attain the technical object may include a sensor set including a plurality of sensors, attached to the pneumatic control valve, for measuring a state of the pneumatic control valve; a smart data analyzer for processing a sensor signal acquired in real time from the sensor set and generating pneumatic control valve state information for online automatic diagnosis of the pneumatic control valve; a data server for transmitting, to an online analysis server, the pneumatic control valve state information received in real time from the smart data analyzer and storing the pneumatic control valve state information for a predetermined time period; the online diagnostic server for determining whether the pneumatic control valve is in an abnormal state and generating diagnostic information by comparing the pneumatic control valve state information with pre-stored normal state data of the pneumatic control valve; and a client computer for displaying the diagnostic information received from the online diagnostic server.

According to an aspect, the sensor set may include at least one of: a stem force sensor, attached to a valve stem of the pneumatic control valve, for measuring a stem force; a stem displacement sensor for measuring a stem motion of the pneumatic control valve; and a pressure sensor for measuring an air pressure on a plurality of points of an air supply tube of a control loop that controls the pneumatic control valve.

According to an aspect, the smart data analyzer may transmit a sensor signal including at least one of a stem force signal acquired from the stem force sensor, a stem displacement signal acquired from the stem displacement sensor and a plurality of pressure signals acquired from the pressure sensor to the data server.

According to an aspect, the smart data analyzer may further generate detail analysis data for user detailed analysis for the pneumatic control valve by processing the sensor signal acquired from the sensor set in real time.

According to an aspect, the client computer may receive the detail analysis data via the data server and the online diagnostic server, and include an analysis tool such that a client is able to analyze a state of the pneumatic control valve based on the detail analysis data.

According to an aspect, the data server may transmit the pneumatic control valve state information to the online diagnostic server with a first time interval, and transmit the detail analysis data to the online diagnostic server with a second time interval which is longer than the first time interval.

According to an aspect, the data server may transmit the detail analysis data to the online diagnostic server in response to a request of the client computer.

According to an aspect, the system for diagnosing a pneumatic control valve online may perform a diagnosis for states of a plurality of pneumatic control valves, and include a plurality of sensor sets, a plurality of smart data analyzers and a plurality of data servers corresponding to the plurality of pneumatic control valves.

A method for diagnosing a pneumatic control valve online according to another embodiment of the present invention to attain the technical object may include measuring a state of the pneumatic control valve, by using a sensor set attached to the pneumatic control valve; generating, by a smart data analyzer, pneumatic control valve state information for online automatic diagnosis of the pneumatic control valve by processing a sensor signal acquired in real time from the sensor set; transmitting, by a data server, the pneumatic control valve state information received in real time from the smart data analyzer to an online analysis server, and storing the pneumatic control valve state information for a predetermined time period; generating diagnostic information, by the online diagnostic server, by determining whether the pneumatic control valve is in an abnormal state by comparing the pneumatic control valve state information with pre-stored normal state data of the pneumatic control valve; and displaying, by a client computer, the diagnostic information received from the online diagnostic server.

According to an aspect, the sensor set may include at least one of: a stem force sensor, attached to a valve stem of the pneumatic control valve, for measuring a stem force; a stem displacement sensor for measuring a stem motion of the pneumatic control valve; and a pressure sensor for measuring an air pressure on a plurality of points of an air supply tube of a control loop that controls the pneumatic control valve.

A storage medium readable by a computer for diagnosing a pneumatic control valve online according to another embodiment of the present invention to attain the technical object may include a processor included in the computer to perform: a command for measuring a state of the pneumatic control valve, by using a sensor set attached to the pneumatic control valve; a command for generating, by a smart data analyzer, pneumatic control valve state information for online automatic diagnosis of the pneumatic control valve by processing a sensor signal acquired in real time from the sensor set; a command for transmitting, by a data server, the pneumatic control valve state information received in real time from the smart data analyzer to an online analysis server, and storing the pneumatic control valve state information for a predetermined time period; a command for generating diagnostic information, by the online diagnostic server, by determining whether the pneumatic control valve is in an abnormal state by comparing the pneumatic control valve state information with pre-stored normal state data of the pneumatic control valve; and a command for displaying, by a client computer, the diagnostic information received from the online diagnostic server.

Advantageous Effects

The disclosed technique may have the following effect. However, this does not mean that a particular embodiment should include all of the following effects or only the following effects, and it is understood that the scope of the disclosed technique is not limited thereto.

According to the method and system for diagnosing a pneumatic control valve online according to an embodiment of the present invention described above, a diagnostic signal of a pneumatic control valve which is important for driving a power plant is obtained in online and transmitted to a remote location in real time, an abnormality of the pneumatic control valve is diagnosed by using the transmitted data, and future progress of the abnormality is predicted in real time, and accordingly, the present invention may contribute to an efficient diagnosis for the pneumatic control valve and prevent a failure.

MODE FOR INVENTION

Figure 1:
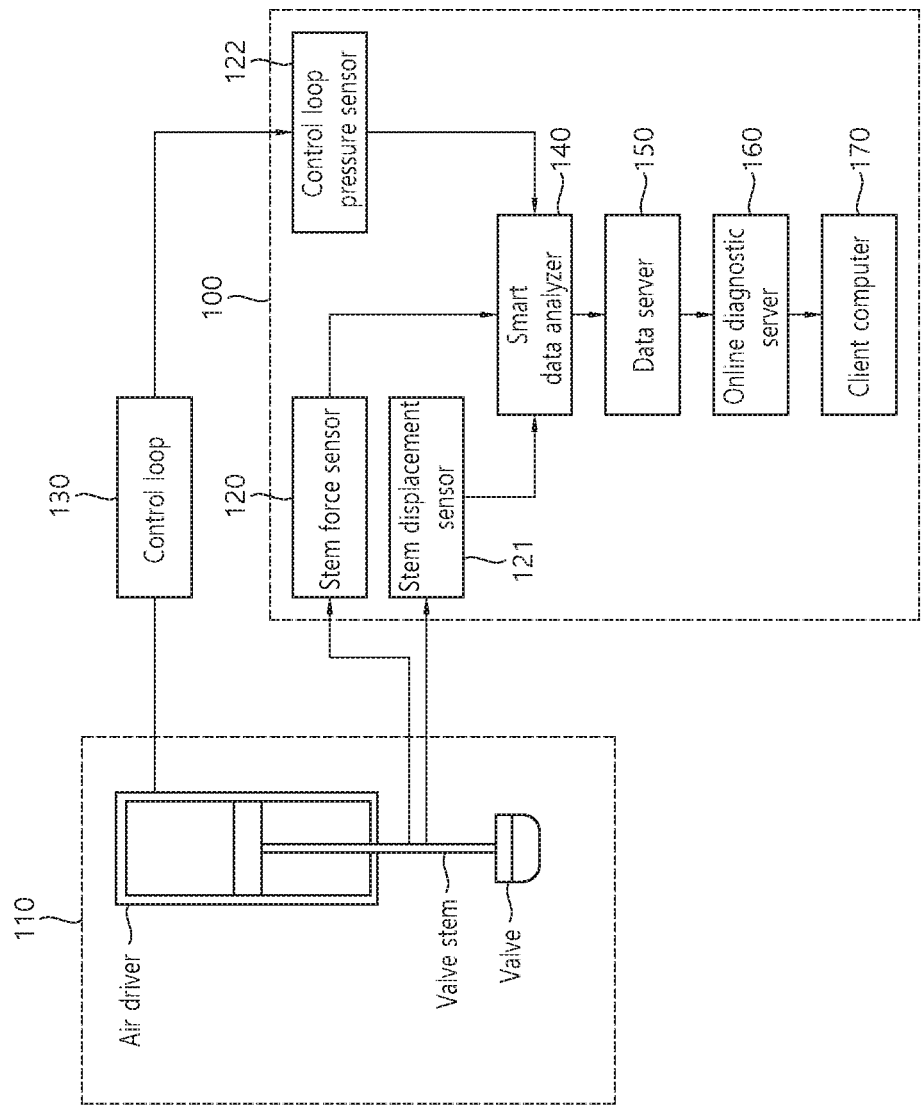
FIG. 1 is a configuration diagram of a system for diagnosing a pneumatic control valve online according to an embodiment of the present invention.

The present invention may have various modifications and various embodiments and specific embodiments will be illustrated in the drawings and described in detail in the detailed description.

However, this does not limit the present invention to specific embodiments, and it should be understood that the present invention covers all the modifications, equivalents and replacements included within the idea and technical scope of the present invention.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

When it is described that a component is "connected to" or "accesses" another component, the component may be directly connected to or access the other component or a third component may be present there between. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present invention will be described in detail with reference to the accompanying drawings and in describing the preferred embodiments with reference to the accompanying drawings, the same reference numeral will refer to the same or corresponding component regardless of the reference numeral and a duplicated description thereof will be omitted.

The example embodiment of the present invention relates to a system for online diagnosing a pneumatic control valve used in a power generation equipment and the like, and more particularly, to a method and system that diagnoses an abnormality of a target control value by obtaining data from a stem force sensor, a displacement sensor and a pressure sensor mounted on the pneumatic control valve extracting and transmitting data required for online diagnosis selectively, and diagnoses future progress of the abnormality.

The system for online diagnosing a pneumatic control valve according to an embodiment of the present invention to solve the problem described above may include a force sensor attached to a valve stem of the pneumatic control valve, a stem displacement sensor, a pressure sensor installed in front and rear ends of a control loop accessory located in an air supply path of the control loop, for example, an I/P converter (current/pressure converter), a position transmitter, a booster, and so on, a smart data analyzer for acquiring data from the sensor and processing, and then selectively extract and transmit data required for online diagnosis, a data server for storing data transmitted from the smart data analyzer for a predetermined time period and transmitting the data required for diagnosis to an online diagnostic server, an online diagnostic server for storing the transmitted data to a central database, and by using this, diagnosing an abnormality of the pneumatic control valve, and evaluating future progress for the abnormal state, and a client computer for receiving data from the online diagnostic server and displaying analysis and diagnosis result in real time and managing system environment.

FIG. 1 is a configuration diagram of a system for diagnosing a pneumatic control valve online according to an embodiment of the present invention. With reference to FIG. 1, the system for diagnosing a pneumatic control valve online according to an embodiment of the present invention is described in detail. Referring to FIG. 1, the system for diagnosing a pneumatic control valve online 100 may include a force sensor 120 attached to a valve stem of the pneumatic control valve 110, a stem displacement sensor 121 for measuring a valve stem motion, a plurality of pressure sensors 122 for measuring air supply pressure variation installed on a plurality of points of a control loop 130 that controls the pneumatic control valve, a smart data analyzer 140 connected with the sensors, a data server 150, an online diagnostic server 160 and a client computer 170. The control loop for controlling the pneumatic control valve includes accessories such as an air pressure adjuster, a current/pressure converter, a position transmitter, a booster, and the like, and air for driving an air driver is supplied through the control loop. The pressure sensor 122 measures air pressure through the air supply path.

The smart data analyzer 140 collects analogue signals such as force of the valve step, a valve stem displacement, an air supply pressure to the air driver from the sensors 120 to 122 and converts the analogue signals to digital signals, and extracts information required for diagnosing the pneumatic control valve and transmits the information to the data server 150. The data server 150 and the online diagnostic server 160 include the function of checking and recovering the system state of the corresponding server, access management, database management, data transmission and reception, data validity check, and the like.

The data server 150 receives data from the smart data analyzer 140 and stores it in database, and further includes the function of transmitting the data to the online diagnostic server 160 located in remote distance. The data server 150 transmits the data required for automatic online diagnosis in an interval such as 1 second, 5 seconds or 10 seconds, and transmits diagnostic signal data required for detailed analysis is transmitted by determining a transmission period or a time according to a network situation, and accordingly, network load may be adjusted.

The online diagnostic server 160 is further provided with an online diagnostic module having the function of monitoring and diagnosing driving state of the pneumatic control valve 110 using the data transmitted from the data server. In the case that network capacity is enough or the installation position of the online diagnostic server is not far from the target pneumatic control valve, the data server 150 is separately provided, but the online diagnostic server 160 may have the function of the data server together.

A user may access to the online diagnostic server 160 and check the diagnostic result for the target pneumatic control valve, and further provide a tool for detailed diagnosis/analysis and integrated/state monitoring screen in real time. The analysis tool collects diagnostic signal data and diagnostic result data from the online diagnostic server according to a user request, and provides a screen required for analysis. The integrated/state monitoring screen in real time collects real time measurement data and system state data from a prediction diagnostic server and displays it on a screen.

Figure 2:
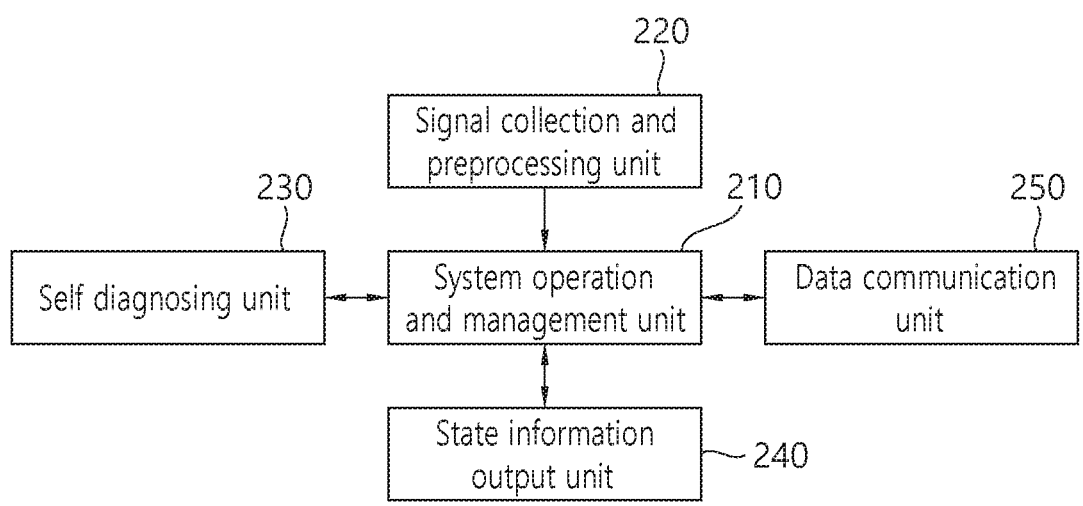
FIG. 2 is a diagram for describing a function of a smart data analyzer.

FIG. 2 is a diagram for describing a function of a smart data analyzer. Referring to FIG. 2, the smart data analyzer shown in FIG. 1 is described in more detail as below. The smart data analyzer is provided with functions such as a system operation and management unit 210, a signal collection and preprocessing unit 220, a self diagnosing unit 230, a state information output unit 240 and a data communication unit 250.

The system operation and management unit 210 performs configuration information management of smart data analyzer and data transmission and reception between functions and generated data management, and the signal collection and preprocessing unit 220 collects analogue signals from the stem force sensor, the stem displacement sensor and the pressure sensor mounted on the pneumatic control valve, performs digital conversion, acquired signals corrections, transforms to actual physical amount, and performs preprocessing function such as start and termination of stroke, identification data generation, and the like. The self diagnosing unit 230 diagnoses a collected signal abnormality, computation load of a system, a memory state, and so on, such that the self diagnosing signal is output to the state information output unit 240. The data communication unit 250 transmits information generated in the signal collection and preprocessing unit 220 and self diagnosing unit 230 to the data server (150; FIG. 1) periodically with a predetermined interval (e.g., 1 second, 5 seconds, 10 seconds, etc.) using Ethernet communication. The smart data analyzer includes 4 channels for collecting force signal, and is available to collect signals up to maximum 20 channels, and mounted with Linux OS such that signal collection and process may be performed automatically.

Figure 3:
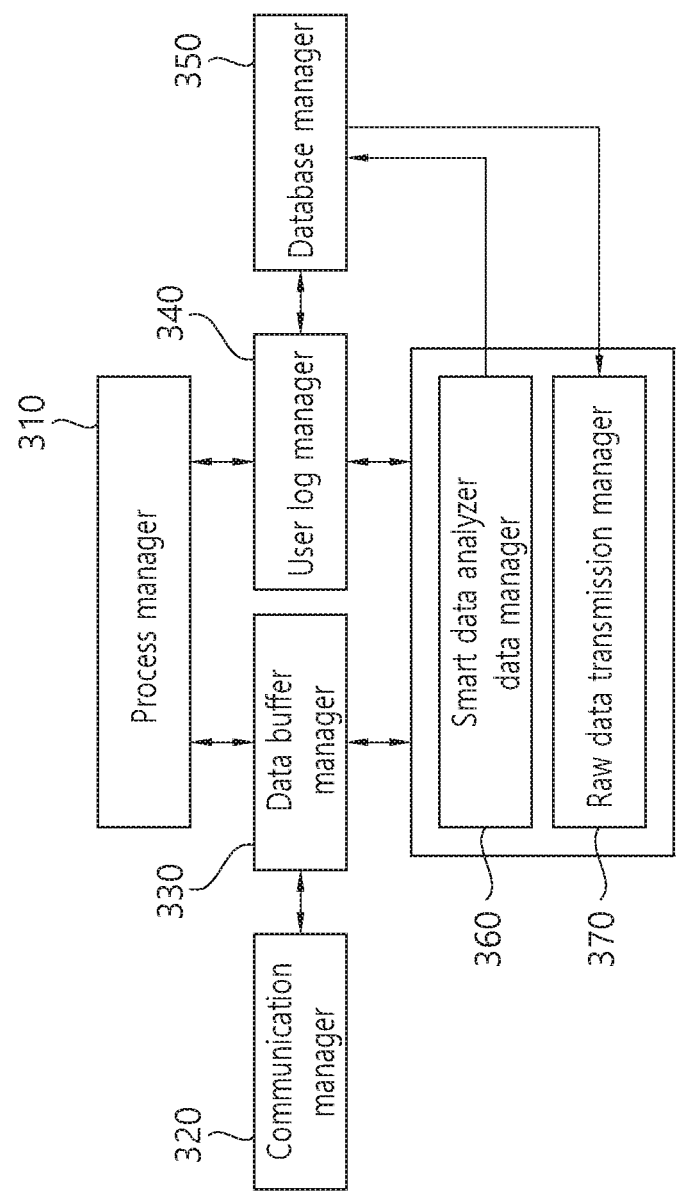
FIG. 3 is a diagram for describing a function of a data server.

FIG. 3 is a diagram for describing a function of a data server. Referring to FIG. 3, the data server 150 shown in FIG. 1 is described in more detail as below. A process manager 310, a communication manager 320, a data buffer manager 330, a user log manager 340 and a database manager 350 are also included in the online diagnostic server (160; FIG. 1) as well as in the data server (150; FIG. 1), and a smart data analyzer data manager 360 and a raw data transmission manager 370 are additionally included in the data server.

The smart data analyzer data manager 360 processes periodic data and state data, event data, and the like, transmitted from the smart data analyzer and stores it in the database. More preferably, the smart data analyzer data manager 360 enables the data provided from the a plurality of smart data analyzers to be stored in the database without loss. In the case that vast amounts of asynchronous and synchronous waveform data which is periodically transmitted is transmitted to the online diagnostic server in real time, network load is caused, which may cause a network failure, and accordingly, the raw data transmission manager 370 performs the function of transmitting data divisionally while minimizing network bandwidth use amount.

Figure 4:
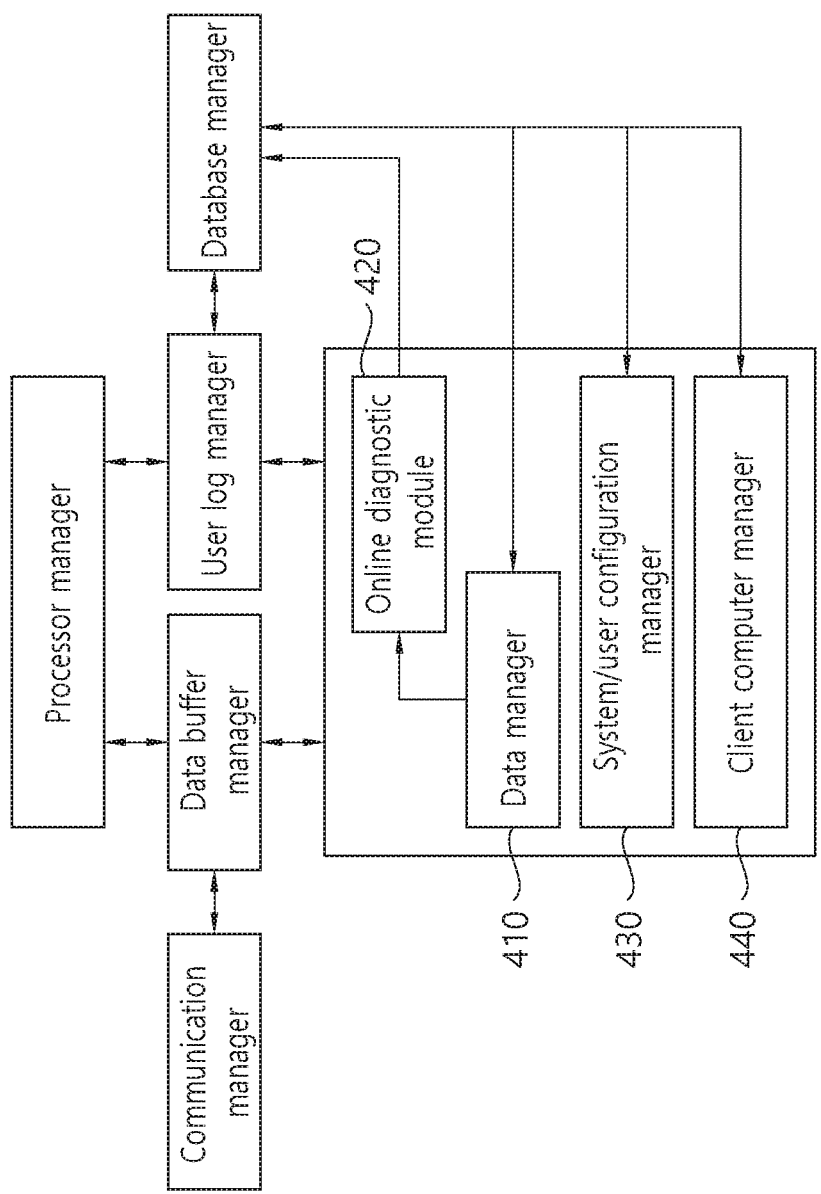
FIG. 4 is a diagram for describing a function of an online diagnostic server.

FIG. 4 is a diagram for describing a function of an online diagnostic server. Referring to FIG. 4, the online diagnostic server (160; FIG. 1) is further provided with a data manager 410, an online diagnostic module 420, system/user configuration manager 430 and a client computer manager 440. The data manager 410 manages input data required in the online diagnostic module 420. And, since the data transmitted from the data server may be transmitted asynchronously owing to a sensor or collection path difference, the data manager 410 includes data time synchronizing function that groups and adjusts data collection times of all input variables. The online diagnostic module 420 generates abnormal state of the target pneumatic control valve and future progress information of the abnormal state using the data transmitted from the data manager 410, and transmits it to database manager. The system/user configuration manager 430 manages a user access and authentication, and performs the function of adding, modifying and deleting data related to system configuration in the database. The client computer manager 440 performs the function of processing data required for displaying on a screen by a user, and performs the function of forwarding data to a client computer using a network communication.

Figure 5:
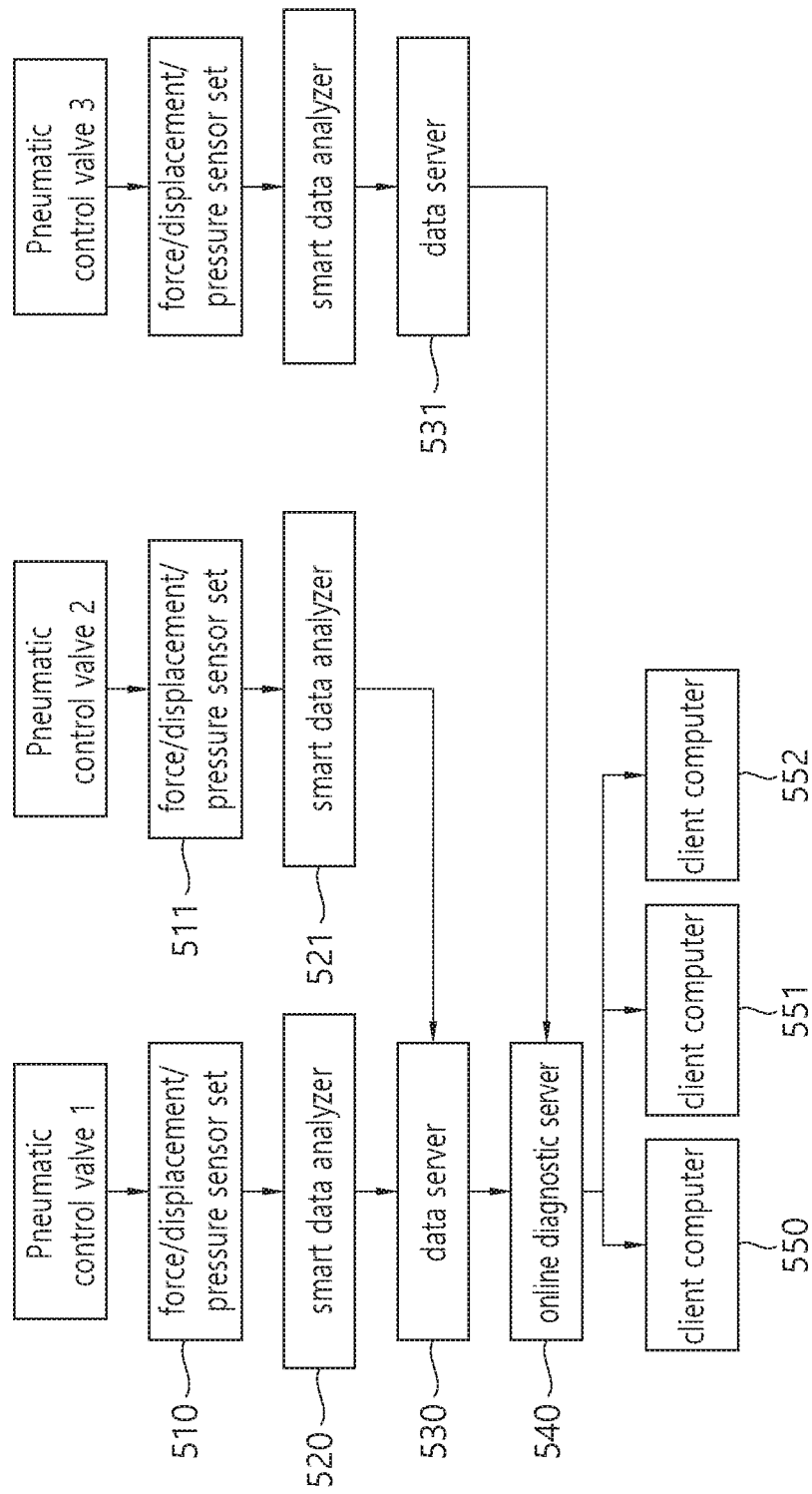
FIG. 5 is a configuration diagram of a method and system for diagnosing a pneumatic control valve online according to another embodiment of the present invention.

FIG. 5 is a configuration diagram of a method and system for diagnosing a pneumatic control valve online according to another embodiment of the present invention. Another embodiment of the present invention is described as below with reference to FIG. 5. A plurality number (510 to 511/520 to 521) of force/displacement/pressure sensor sets 510 and smart data analyzers 520 may be installed and may be used with being connected to a single data server 530. According to processing capacity and network load of the data server, the data server and the network bandwidth may be added and extended. The online diagnostic server 540 installed on a remote location may process a plurality of data servers 530 and 531 and client computers 550 to 552. In addition, considering extendibility, the online diagnostic server 540 constructs the database of the online diagnostic server in a separate server, and the online diagnostic module is also constructed in a separate server. Accordingly, each of the processes is separated, and it is available to design a system that may be extended infinitely while a processing performance is guaranteed.

Figure 6:
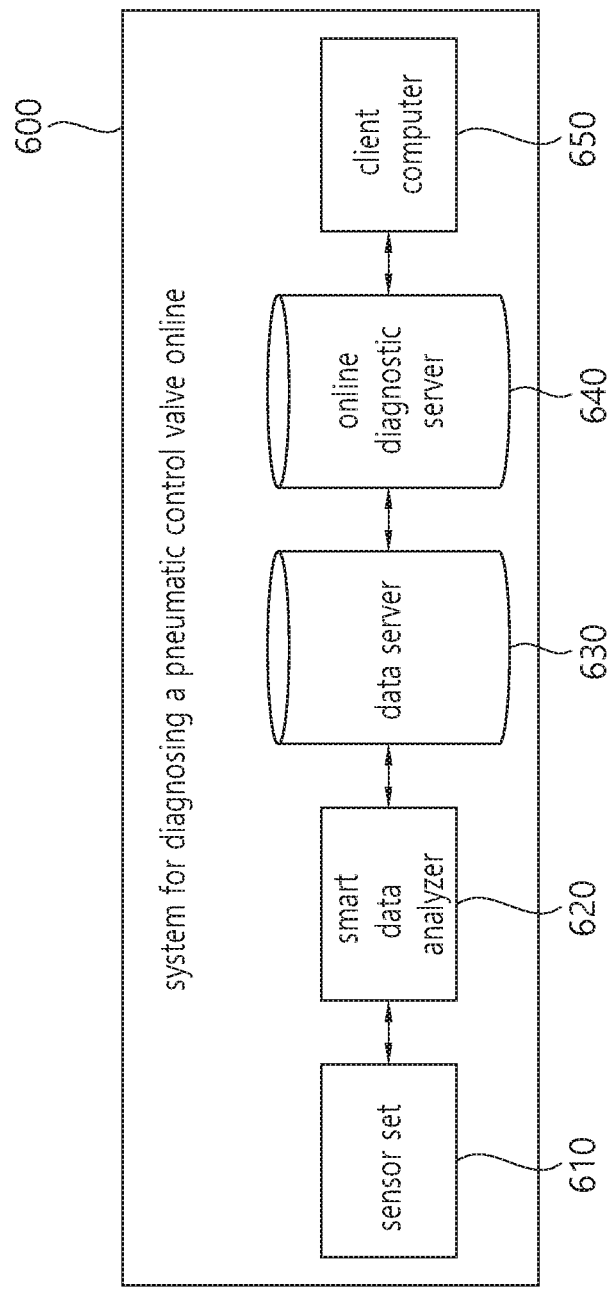
FIG. 6 is a configuration diagram of a system for diagnosing a pneumatic control valve online according to an embodiment of the present invention.
Figure 7:
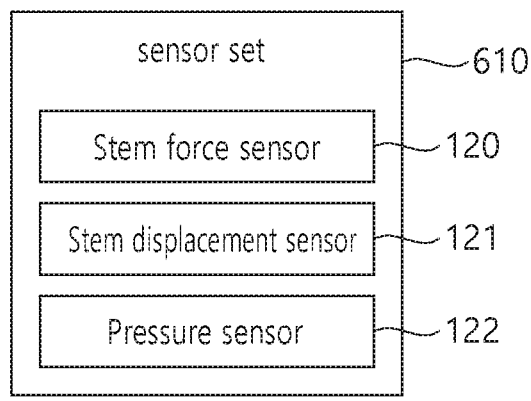
FIG. 7 is a detailed block diagram of a sensor set.

FIG. 6 is a configuration diagram of a system for diagnosing a pneumatic control valve online according to an embodiment of the present invention, and FIG. 7 is a detailed block diagram of a sensor set. Hereinafter, a system for diagnosing a pneumatic control valve online according to an embodiment of the present invention is described in more detail with reference to FIG. 6 and FIG. 7.

As shown in FIG. 6, a system for diagnosing a pneumatic control valve online 600 according to an embodiment of the present invention may include a sensor set 610, a smart data analyzer 620, a data server 630, an online diagnostic server 640 and a client computer 650.

The sensor set 610 may be attached to a pneumatic control valve and include a plurality of sensors for measuring a state of the pneumatic control valve. Such a plurality of sensors may include at least one of a stem force sensor 120, attached to a valve step of the pneumatic control valve, for measuring a stem force, a stem displacement sensor 121 for measuring a stem motion of the pneumatic control valve and a pressure sensor 122 for measuring an air pressure on a plurality of points of an air supply tube of a control loop that controls the pneumatic control valve.

The smart data analyzer 620 may process a sensor signal acquired in real time from the sensor set 610 and generate pneumatic control valve state information for online automatic diagnosis of the pneumatic control valve.

Meanwhile, the smart data analyzer 620 may transmit a sensor signal including at least one of a stem force signal acquired from the stem force sensor 120, a stem displacement signal acquired from the stem displacement sensor 121 and a plurality of pressure signals acquired from the pressure sensor 122 to the data server 630.

According to an aspect, the smart data analyzer 620 may further generate detail analysis data for user detailed analysis for the pneumatic control valve by processing the sensor signal acquired from the sensor set 610 in real time. In addition, the generated detail analysis data may be transmitted to at least one of the data server 630, the online diagnostic server 640 and the client computer 650.

The data server 630 may transmit, to the online analysis server, the pneumatic control valve state information received in real time from the smart data analyzer and storing the pneumatic control valve state information for a predetermined time period. Meanwhile, the data server 630 may further receive detail analysis data from the smart data analyzer 620. In the case of receiving the detail analysis data, the data server 630 may transmit the pneumatic control valve state information to the online diagnostic server 640 with a first time interval, and transmit the detail analysis data to the online diagnostic server 640 with a second time interval which is longer than the first time interval. Alternatively, only in the case that there is a request from the client computer 650, the data server 630 may transmit the detail analysis data to the online diagnostic server 640 or the client computer 650 in response to the request of the client computer.

The online diagnostic server 640 may determining whether the pneumatic control valve is in an abnormal state and generate diagnostic information by comparing the pneumatic control valve state information with pre-stored normal state data of the pneumatic control valve.

The client computer 650 may display the diagnostic information received from the online diagnostic server 640 such that a user may identify whether there is abnormality or not. Furthermore, the client computer 650 may receive the detail analysis data via the data server 630 or the online diagnostic server 640, or directly from the smart data analyzer 620, and include an analysis tool such that a client (a user) is able to analyze a state of the pneumatic control valve directly based on the detail analysis data.

Meanwhile, referring to FIG. 6, a single of the sensor set 610, the smart data analyzer 620 and the data server 630 are shown, but the system for diagnosing a pneumatic control valve online 600 according to an embodiment of the present invention may perform diagnosis for states of a plurality of pneumatic control valves. In this case, the system for diagnosing a pneumatic control valve online 600 may include a plurality of sensor sets, a plurality of smart data analyzers and a plurality of data servers corresponding to the plurality of pneumatic control valves, respectively. Alternatively, a single data server may be assigned to two or more pneumatic control valves and the corresponding sensor set and the corresponding smart data analyzer and an additional data server may be assigned to different pneumatic control valve.

Figure 8:
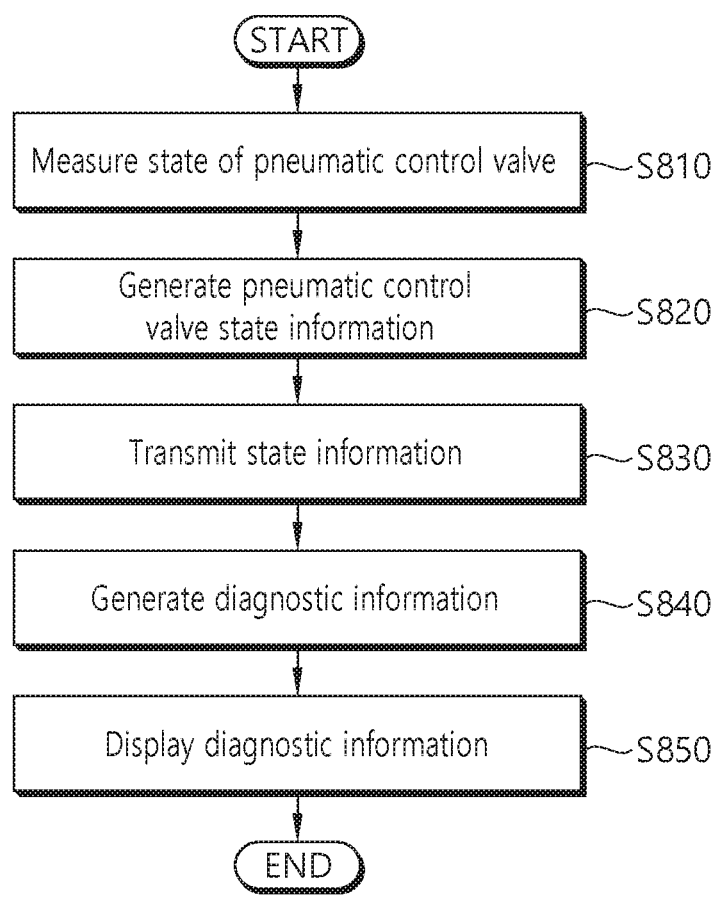
FIG. 8 is a flowchart of a method for diagnosing a pneumatic control valve online according to an embodiment of the present invention.

FIG. 8 is a flowchart of a method for diagnosing a pneumatic control valve online according to an embodiment of the present invention. With reference to FIG. 8, a method for diagnosing a pneumatic control valve online according to an embodiment of the present invention is described in detail.

As shown in FIG. 8, a state of the pneumatic control valve is measured by using a sensor set attached to the pneumatic control valve (step, S810). Later, a smart data analyzer generates pneumatic control valve state information for online automatic diagnosis of the pneumatic control valve by processing a sensor signal acquired in real time from the sensor set (step, S820). A data server may transmit the pneumatic control valve state information received in real time from the smart data analyzer to an online analysis server and store the pneumatic control valve state information for a predetermined time period (step, S830). The online diagnostic server may generate diagnostic information by determining whether the pneumatic control valve is in an abnormal state by comparing the pneumatic control valve state information with pre-stored normal state data of the pneumatic control valve (step, S840). Next, a client computer may display the diagnostic information received from the online diagnostic server (step, S850).

The method for diagnosing a pneumatic control valve online according to an embodiment of the present invention may be further embodied according to the operation of the system for diagnosing a pneumatic control valve online described above.

The method and system for diagnosing a pneumatic control valve online according to an example embodiment of the present invention may be implemented in a medium readable by a computer as codes readable by a computer. The medium readable by a computer includes all types of record media in which data readable by a computer system is stored. For example, the medium may include ROM (Read Only Memory), RAM (Random Access Memory), magnetic tape, magnetic disk, flash memory, optical data storage device, and the like. In addition, the medium readable by a computer may be distributed to a computer system connected to a computer network, and stored as codes readable in distributed manner and executed.

So far, the present invention is described with reference to drawings and embodiments. However, it is understood that the scope of the present invention is not limited to the drawings and the embodiments, and those skilled in the art may modify and change the present invention in various ways within the scope not departing from the concept and the scope of the present invention written in the following claims.

[Description of reference numerals]

| | |
|---|---|
| 100: method and system for diagnosing a pneumatic control valve online | |
| 110: pneumatic control valve | 120: step force sensor |
| 121: stem displacement sensor | 122: control loop pressure sensors |
| 130: control loop | 140: smart data analyzer |
| 150: data server | 160: online diagnostic server |
| 170: client computer | |
| 210: system operation and management unit | 220: signal collection and preprocessing unit |
| 230: self diagnosing unit | 240: state information output unit |
| 250: data communication unit | |
| 310: process manager | 320: communication manager |
| 330: data buffer manager | 340: user log manager |
| 350: database manager | |
| 360: smart data analyzer data manager | |
| 370: raw data transmission manager | |
| 410: data manager | 420: online diagnostic module |
| 430: system/user configuration manager | 440: client computer manager |
| 510, 511: force/displacement/pressure sensor set | 520, 521: smart data analyzer |
| 530, 531: data server | 540: online diagnostic server |
| 550~552: client computer | |
| 600: system for diagnosing a pneumatic control valve online | |
| 610: sensor set | 620: smart data analyzer |
| 630: data server | 640: online diagnostic server |
| 650: client computer | |

The invention claimed is:

1. A system for diagnosing a pneumatic control valve online, comprising:
   a sensor set including a plurality of sensors, attached to the pneumatic control valve, for measuring a state of the pneumatic control valve;
   a smart data analyzer for processing a sensor signal acquired in real time from the sensor set and generating pneumatic control valve state information for online automatic diagnosis of the pneumatic control valve;
   a data server for divisionally transmitting, considering network bandwidth use amount, to an online analysis server, the pneumatic control valve state information received in real time from the smart data analyzer and storing the pneumatic control valve state information for a predetermined time period;
   the online diagnostic server for determining whether the pneumatic control valve is in an abnormal state and generating diagnostic information by comparing the pneumatic control valve state information with pre-stored normal state data of the pneumatic control valve and performing data time synchronization that groups data included in the pneumatic control valve state information based on data collection times; and
   a client computer for displaying the diagnostic information received from the online diagnostic server, wherein:
   the smart data analyzer further generates detail analysis data for user detailed analysis for the pneumatic control valve by processing the sensor signal acquired from the sensor set in real time, the client computer receives the detail analysis data via the data server and the online diagnostic server, and includes an analysis tool such that a client is able to analyze a state of the pneumatic control valve based on the detail analysis data, and the data server transmits the pneumatic control valve state information to the online diagnostic server with a first time interval, and transmits the detail analysis data to the online diagnostic server with a second time interval which is longer than the first time interval.

2. The system for diagnosing a pneumatic control valve online of claim 1, wherein the sensor set includes at least one of:
a stem force sensor, attached to a valve stem of the pneumatic control valve, for measuring a stem force;
a stem displacement sensor for measuring a stem motion of the pneumatic control valve; and
a pressure sensor for measuring an air pressure on a plurality of points of an air supply tube of a control loop that controls the pneumatic control valve.

3. The system for diagnosing a pneumatic control valve online of claim 2, wherein the smart data analyzer transmits a sensor signal including at least one of a stem force signal acquired from the stem force sensor, a stem displacement signal acquired from the stem displacement sensor and a plurality of pressure signals acquired from the pressure sensor to the data server.

4. The system for diagnosing a pneumatic control valve online of claim 1, wherein the data server transmits the detail analysis data to the online diagnostic server in response to a request of the client computer.

5. The system for diagnosing a pneumatic control valve online of claim 1, wherein the system for diagnosing a pneumatic control valve online performs a diagnosis for states of a plurality of pneumatic control valves, and includes:
a plurality of sensor sets, a plurality of smart data analyzers and a plurality of data servers corresponding to the plurality of pneumatic control valves.

6. A method for diagnosing a pneumatic control valve online, comprising:
measuring a state of the pneumatic control valve, by using a sensor set attached to the pneumatic control valve;
generating, by a smart data analyzer, pneumatic control valve state information for online automatic diagnosis of the pneumatic control valve by processing a sensor signal acquired in real time from the sensor set;
transmitting divisionally, by a data server, the pneumatic control valve state information received in real time from the smart data analyzer to an online analysis server considering network bandwidth use amount, and storing the pneumatic control valve state information for a predetermined time period;
generating diagnostic information, by the online diagnostic server, by determining whether the pneumatic control valve is in an abnormal state by comparing the pneumatic control valve state information with pre-stored normal state data of the pneumatic control valve and performing data time synchronization that groups data included in the pneumatic control valve state information based on data collection times; and
displaying, by a client computer, the diagnostic information received from the online diagnostic server, wherein:

the smart data analyzer further generates detail analysis data for user detailed analysis for the pneumatic control valve by processing the sensor signal acquired from the sensor set in real time, the client computer receives the detail analysis data via the data server and the online diagnostic server, and includes an analysis tool such that a client is able to analyze a state of the pneumatic control valve based on the detail analysis data, and the data server transmits the pneumatic control valve state information to the online diagnostic server with a first time interval, and transmits the detail analysis data to the online diagnostic server with a second time interval which is longer than the first time interval.

7. The method for diagnosing a pneumatic control valve online of claim 6, wherein the sensor set includes at least one of:
a stem force sensor, attached to a valve stem of the pneumatic control valve, for measuring a stem force;
a stem displacement sensor for measuring a stem motion of the pneumatic control valve; and
a pressure sensor for measuring an air pressure on a plurality of points of an air supply tube of a control loop that controls the pneumatic control valve.

8. The method for diagnosing a pneumatic control valve online of claim 7, wherein the smart data analyzer transmits a sensor signal including at least one of a stem force signal acquired from the stem force sensor, a stem displacement signal acquired from the stem displacement sensor and a plurality of pressure signals acquired from the pressure sensor to the data server.

9. The method for diagnosing a pneumatic control valve online of claim 6, wherein the data server transmits the detail analysis data to the online diagnostic server in response to a request of the client computer.

10. The method for diagnosing a pneumatic control valve online of claim 6, wherein the system for diagnosing a pneumatic control valve online performs a diagnosis for states of a plurality of pneumatic control valves, and includes:
a plurality of sensor sets, a plurality of smart data analyzers and a plurality of data servers corresponding to the plurality of pneumatic control valves.

11. A non-transitory storage medium readable by a computer for diagnosing a pneumatic control valve online, comprising instructions that, when executed by a computer, cause it to perform:
a command for measuring a state of the pneumatic control valve, by using a sensor set attached to the pneumatic control valve;
a command for generating, by a smart data analyzer, pneumatic control valve state information for online automatic diagnosis of the pneumatic control valve by processing a sensor signal acquired in real time from the sensor set;
a command for divisionally transmitting, by a data server, the pneumatic control valve state information received in real time from the smart data analyzer to an online analysis server considering network bandwidth use amount, and storing the pneumatic control valve state information for a predetermined time period;
a command for generating diagnostic information, by the online diagnostic server, by determining whether the pneumatic control valve is in an abnormal state by comparing the pneumatic control valve state information with pre-stored normal state data of the pneumatic control valve and performing data time synchronization that groups data included in the pneumatic control valve state information based on data collection times; and a command for displaying, by a client computer, the diagnostic information received from the online diagnostic server, wherein:

the smart data analyzer further generates detail analysis data for user detailed analysis for the pneumatic control valve by processing the sensor signal acquired from the sensor set in real time, the client computer receives the detail analysis data via the data server and the online diagnostic server, and includes an analysis tool such that a client is able to analyze a state of the pneumatic control valve based on the detail analysis data, and the data server transmits the pneumatic control valve state information to the online diagnostic server with a first time interval, and transmits the detail analysis data to the online diagnostic server with a second time interval which is longer than the first time interval.

12. The non-transitory storage medium readable by a computer for diagnosing a pneumatic control valve online of claim 11, wherein the sensor set includes at least one of:

a stem force sensor, attached to a valve stem of the pneumatic control valve, for measuring a stem force;

a stem displacement sensor for measuring a stem motion of the pneumatic control valve; and a pressure sensor for measuring an air pressure on a plurality of points of an air supply tube of a control loop that controls the pneumatic control valve.

13. The non-transitory storage medium readable by a computer for diagnosing a pneumatic control valve online of claim 12, wherein the smart data analyzer transmits a sensor signal including at least one of a stem force signal acquired from the stem force sensor, a stem displacement signal acquired from the stem displacement sensor and a plurality of pressure signals acquired from the pressure sensor to the data server.

14. The non-transitory storage medium readable by a computer for diagnosing a pneumatic control valve online of claim 11, wherein the data server transmits the detail analysis data to the online diagnostic server in response to a request of the client computer.

15. The non-transitory storage medium readable by a computer for diagnosing a pneumatic control valve online of claim 11, wherein the system for diagnosing a pneumatic control valve online performs a diagnosis for states of a plurality of pneumatic control valves, and includes:

a plurality of sensor sets, a plurality of smart data analyzers and a plurality of data servers corresponding to the plurality of pneumatic control valves.

\* \* \* \* \*